United States Patent
Lagrue et al.

(10) Patent No.: US 6,513,854 B2
(45) Date of Patent: Feb. 4, 2003

(54) METHOD OF APPLYING EXTRUDED PROFILE TO CORNERS OF A WINDOW GLAZING

(75) Inventors: Herve Lagrue, Thionville (FR); Craig A. Baldwin, Pleasant Ridge, MI (US); Laurent Dahm, Strassen (LU); Frank Thurau, Konz (DE)

(73) Assignees: Centre Luxembourgeois de Recherches pour le Verre et la Ceramique S.A. (C.R.V.C.), Grand-Duchy of Luxembourg; Guardian Industries Corp., Auburn Hills, MI (US)

(*) Notice: Subject to any disclaimer, the term of this patent is extended or adjusted under 35 U.S.C. 154(b) by 0 days.

(21) Appl. No.: 09/783,394

(22) Filed: Feb. 15, 2001

(65) Prior Publication Data

US 2002/0109370 A1 Aug. 15, 2002

(51) Int. Cl.⁷ .............................. B60J 10/02
(52) U.S. Cl. ............... 296/93; 52/208; 156/244.18; 156/250; 156/304.1
(58) Field of Search ............ 296/84.1, 93, 146, 296/201, 208; 52/208, 716.5; 264/252; 156/244.11, 244.18, 244.19, 250, 251, 256, 257, 266, 304.1, 304.3, 322, 515

(56) References Cited

U.S. PATENT DOCUMENTS

| | | | | |
|---|---|---|---|---|
| 1,975,895 A | | 10/1934 | Geyer | 20/56.5 |
| 3,831,990 A | * | 8/1974 | Singh et al. | 293/1 |
| 3,969,172 A | * | 7/1976 | Hotton | 156/211 |
| 4,160,052 A | * | 7/1979 | Krysiak et al. | 428/31 |
| 4,284,464 A | | 8/1981 | Forster | 156/510 |
| 4,387,128 A | * | 6/1983 | Emms et al. | 428/60 |
| 4,397,705 A | * | 8/1983 | Eckert | 156/242 |
| 4,738,069 A | * | 4/1988 | Williams | 52/658 |
| 4,839,122 A | | 6/1989 | Weaver | 264/129 |
| 4,840,001 A | * | 6/1989 | Kimisawa | 52/208 |

(List continued on next page.)

FOREIGN PATENT DOCUMENTS

| | | |
|---|---|---|
| EP | 0 368 669 A2 | 5/1990 |
| GB | 2 015 628 A | 9/1979 |
| GB | 2 093 407 A | 9/1982 |
| JP | 11-569913 | 6/1999 |
| WO | WO 98/22687 | 5/1998 |

*Primary Examiner*—D. Glenn Dayoan
*Assistant Examiner*—Paul Chenevert
(74) *Attorney, Agent, or Firm*—Nixon & Vanderhye P.C.

(57) ABSTRACT

A method for adhering/bonding a frame profile (e.g., weather strip, water seal, spacer, etc.) to a substrate (e.g., glass or plastic substrate) in the context of a vehicle window unit. An extruded frame profile is cut, notched, and/or heated in order to create a corner portion thereof that will more easily conform to a corner area of the substrate. In certain embodiments, a V-shaped notch may be cut in the profile, while in other embodiments the profile may be mitered. In still further embodiments, the profile may be heated in order to enable a corner area thereof to more easily bend/stretch at a corner area of the substrate to which it is bonded/attached. The profile may be bonded/attached to the substrate via double sided tape, via selectively heat-activatable adhesive, or any other suitable adhesive.

21 Claims, 10 Drawing Sheets

U.S. PATENT DOCUMENTS

| | | | | |
|---|---|---|---|---|
| 4,884,380 A | * | 12/1989 | Yada et al. | 52/208 |
| 5,028,460 A | * | 7/1991 | Kimura et al. | 428/31 |
| 5,035,937 A | * | 7/1991 | Nozaki | 428/122 |
| 5,039,157 A | * | 8/1991 | Yada | 296/93 |
| 5,057,265 A | | 10/1991 | Kunert et al. | 264/511 |
| 5,074,610 A | * | 12/1991 | Tamura et al. | 296/93 |
| 5,108,526 A | | 4/1992 | Cornils et al. | 156/108 |
| 5,154,028 A | | 10/1992 | Hill et al. | 52/208 |
| 5,273,704 A | | 12/1993 | Scholl et al. | 264/252 |
| 5,316,829 A | | 5/1994 | Cordes et al. | 428/192 |
| 5,332,541 A | * | 7/1994 | Tamura | 264/149 |
| 5,358,764 A | * | 10/1994 | Roberts et al. | 428/31 |
| 5,443,673 A | | 8/1995 | Fisher et al. | 156/245 |
| 5,456,874 A | | 10/1995 | Cordes et al. | 264/138 |
| 5,519,979 A | | 5/1996 | Kunert et al. | 52/745.15 |
| 5,525,174 A | * | 6/1996 | Gold | 156/108 |
| 5,547,359 A | | 8/1996 | Cordes et al. | 425/125 |
| 5,571,461 A | | 11/1996 | Scholl et al. | 264/40.5 |
| 5,580,628 A | | 12/1996 | Cordes et al. | 428/38 |
| 5,601,328 A | * | 2/1997 | Bruhnke et al. | 296/96.21 |
| 5,618,079 A | | 4/1997 | Yukihiko et al. | 296/93 |
| 5,635,019 A | | 6/1997 | Lafond | 156/574 |
| 5,795,421 A | * | 8/1998 | Takahashi et al. | 156/108 |
| 5,833,297 A | | 11/1998 | Yada et al. | 296/93 |
| 5,885,695 A | | 3/1999 | Kittel et al. | 428/142 |
| 5,908,595 A | | 6/1999 | Cornils et al. | 264/252 |
| 5,975,181 A | * | 11/1999 | Lafond | 156/523 |
| 6,203,639 B1 | | 3/2001 | Swanson et al. | 156/108 |
| 6,338,223 B1 | * | 1/2002 | Stahl | 49/463 |
| 2002/0104276 A1 | * | 8/2002 | Lucas et al. | 52/204.53 |

* cited by examiner

FIG. 4(a) step 1

FIG. 4(b) step 2

METHOD OF APPLYING EXTRUDED PROFILE TO CORNERS OF A WINDOW GLAZING

This invention relates to a method of making a window unit for use in vehicles such as cars, trucks, sport utility vehicles (SUVs), and the like. In particular, this invention relates to a method of making a window unit by applying an extruded frame profile to at least one corner area of a glazing.

BACKGROUND OF THE INVENTION

It is known to provide a glass substrate with a frame-like polymer profile proximate an edge portion thereof. For example, see U.S. Pat. Nos. 5,154,028; 5,108,526; 5,057,265; 5,833,297; and 5,456,874, the disclosures of which are all hereby incorporated herein by reference.

Polymer profiles may be extruded onto a glass substrate and thereafter cured. See U.S. Pat. Nos. 5,108,526 and 5,057,265. Extruded frame profiles affixed to a glass surface may, for example, be used as an intermediate body (or spacer) to which an adhesive bead is applied during the assembly of automotive windows, where the bead bonds the profile to a corresponding window frame of the vehicle (e.g., see the '265 patent). Frame profiles may also be designed to limit the spread of adhesive along a major surface of a glass substrate. Frame profiles may also include a lip that may be used either for centering purposes (e.g., see the '265 patent), or alternatively as a weatherstrip (e.g., water seal) and/or gap covering unit.

FIG. 1 illustrates a known polymer profile frame (same as "frame profile" herein) bonded to a glass substrate in a vehicle window application. In particular, the window assembly includes glass substrate 1 provided in a window frame including attachment flanges 3 that run approximately parallel to the substrate 1 surface and wall(s) 4 that is aligned at an angle of from about 45 to 135 degrees relative to flange(s) 3. Polymer frame profile 5 including lip 7 is provided on a major surface 9 of glass substrate 1. Optionally, opaque layer 11 (e.g., frit layer, baked black/dark enamel layer, etc.), may be provided so that polymer profile 5 is on the surface 9 of substrate 1 with layer 11 therebetween. Adhesive 27 bonds the substrate 1 to the metal window frame 3, 4.

Referring to FIGS. 1 and 2 herein, U.S. Pat. No. 5,108,526 teaches extruding a polymer profile frame 5 directly onto the surface of a glass plate or substrate 1, with the polymer profile 5 thereafter curing. As shown in FIG. 2, socket 17 of extrusion die 13 is connected to a polymer supply tube so as to enable polymer to flow into supply channels 19 and 21. The two supply channels 19, 21 empty into distributing chamber 23. Optionally, channel 21 may be adjusted via screw 25. Polymer material flows through channels 19 and/or 21 and into chamber 23. From distributing chamber 23, the molten polymer flows through orifice 15 and onto the substrate.

It is known in the art that forming frame profile corners at corner areas of a glazing is difficult. For example, in column 9, U.S. Pat. No. 5,456,874 states that "it is impossible to deal with very tight corners with extrusion nozzles and it is consequently impossible to follow a sharp edge of the glazing . . . in those parts of the glazing with very small radii or curvature, the peripheral lip is very difficult to obtain by extrusion." The '874 patent attempts to overcome this problem by completely regenerating corner areas of a frame profile on a glazing. To do so, the '874 patent teaches to: (i) extrude a profile frame directly onto a glazing, including corner areas, (ii) cut off the corner area(s) of the profile frame, and then (iii) bring upper and lower halves of a molding die device to the glazing corner area(s) so that a new corner portion can be formed via injection molding. Unfortunately, the system of the '874 patent is highly complicated and requires the significant expense and burden associated with the mold tooling in addition to the extrusion tooling.

In view of the above, it will be apparent to those skilled in the art that there exists a need for a system/method that enables corner areas of a frame profile to be more easily formed and/or attached/bonded to a substrate or glazing (e.g., glass substrate). There also exists a need in the art for a method which allows (i) a frame profile to be produced using extrusion technology, and (ii) the extruded profile to be applied to a glazing surface including corner areas thereof in an efficient manner.

SUMMARY OF THE INVENTION

An object of this invention is to provide a method/system for more easily forming a polymer profile frame at corner area(s) of a glazing. The polymer profile may be adhered directly to the glazing in certain embodiments, or there may be a frit and/or black opaque enamel layer between the glazing surface and the profile in other embodiments. In all of these scenarios, the profile is considered to be "on" the glazing or substrate, and is considered to be supported thereby regardless of whether additional layer(s) are provided therebetween.

Another object of this invention it to enable an extruded polymer frame profile to be adhered to a glazing proximate corner area(s) thereof, without the need for injection molding a replacement corner of the profile.

Another object of this invention it to extrude a profile frame, allow it to at least partially (and preferably fully) cure, and thereafter adhere it to a glazing along both elongated straight side(s) of the glazing and at corner area(s) thereof. The profile frame may be adhered to the glazing via any one of several potential methods, including but not limited to: (a) double sided tape; (b) coextruding a profile frame so as to include both a polymer profile portion and a selectively activatable adhesive portion, and thereafter heat activating the adhesive portion and adhering the polymer profile portion to the glazing using the same; and/or (c) use of a separately extruded or otherwise applied adhesive between the profile and the glazing.

Another object of this invention is to adhere/bond an extruded profile to a substrate without having to apply the profile to the substrate immediately upon the profile exiting the extruding die.

Another object of this invention is to fulfill one or more of the aforesaid object(s) and/or need(s).

BRIEF DESCRIPTION OF THE DRAWINGS

FIG. 4(a) is a top plan view of a polymer frame profile after being extruded and cut, but before being attached to the substrate or glazing, in accordance with the FIG. 3 embodiment of this invention.

FIG. 4(b) is a top plan view of a polymer frame profile of FIG. 4(a) after it is bent and attached to the substrate or glazing.

DETAILED DESCRIPTION OF CERTAIN EMBODIMENTS OF THIS INVENTION

Figure 1:
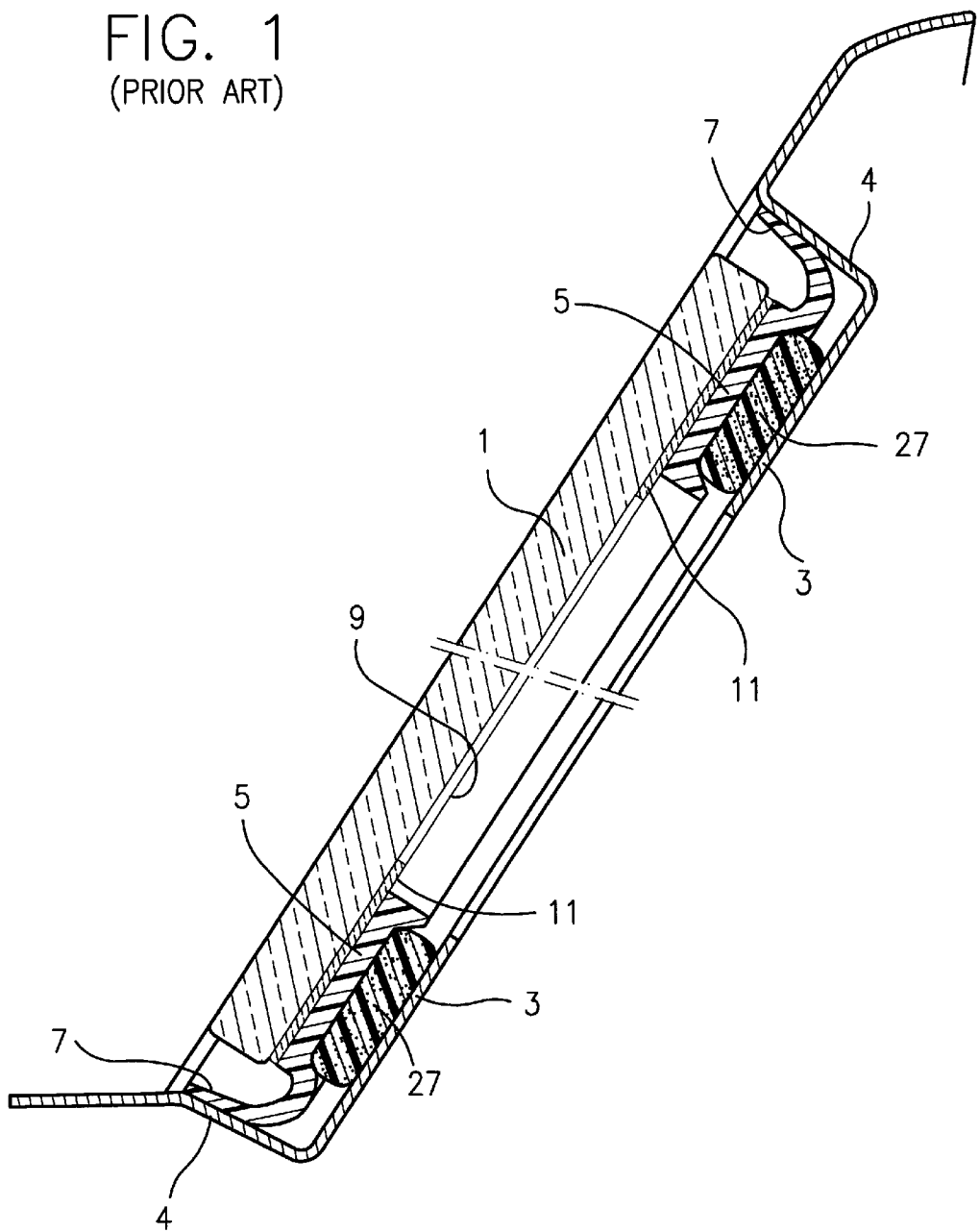
FIG. 1 cross sectional view of a conventional vehicle window assembly.
Figure 2:
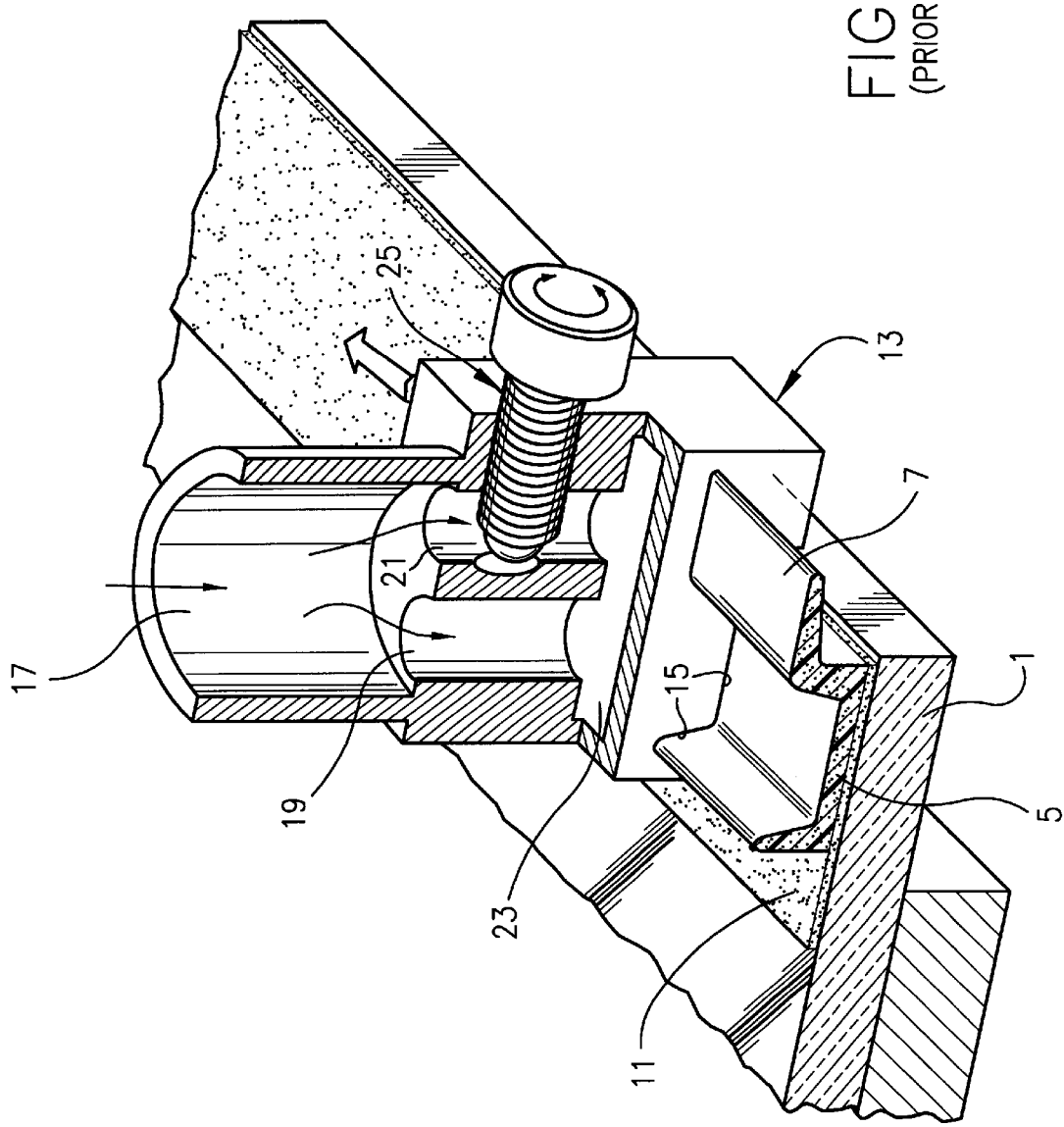
FIG. 2 is a perspective partial cross sectional view of a conventional extruder which may be used to extrude the polymer frame profile of FIG. 1 immediately onto a glass substrate or glazing.

In the following description, for purposes of explanation and not limitation, specific details are set forth in order to provide an understanding of certain embodiments of the present invention. However, it will be apparent to those skilled in the art that the present invention may be practiced in other embodiments that depart from these specific details. In other instances, detailed descriptions of well known devices, processes, techniques, and methods are omitted so as to not obscure the description with unnecessary detail. Referring now more particularly to the accompanying drawings, in which like reference numerals indicate like parts/elements throughout the several views.

The instant invention provides a method for adhering/bonding a frame profile (e.g., weather strip, water seal, spacer, etc.) to a glazing/substrate (e.g., glass or plastic substrate) in the context of a vehicle window unit. Any suitable frame profile shape may be used in different embodiments of this invention. For example and without limitation, any of the profile shapes of any of U.S. Pat. Nos. 5,154,028; 5,108,526; 5,057,265; 5,833,297; 4,839,122; 5,443,673; 5,618,079; and 5,456,874 may be used herein, as well as any other suitable profile shapes.

In accordance with certain embodiments of this invention, a frame profile is formed via extrusion (the term "extrusion" as used herein includes both extrusion and coextrusion). Following coextrusion, the frame profile may be stored, may be cut into units of select length, may be trimmed, may be allowed to cure (fully or partially), etc. Thereafter, the frame profile is applied to a surface(s) of a glazing along at least one side(s) thereof and proximate at least one corner(s) thereof. The frame profile may be adhered to the substrate/glazing via double-sided adhesive tape, or alternatively via a selectively heat-activatable adhesive layer that is coextruded along with the frame profile. Other suitable means for adhering the profile to the substrate may also be used.

A number of different techniques are disclosed herein for enabling the extruded frame profile to be easily attached proximate corner areas of the substrate/glazing. A first technique (i.e., continuous corner technique; e.g., see FIGS. 3–4) involves cutting a notch (e.g., V-shaped notch) in the frame profile and thereafter bending the profile at a point proximate the central portion of the notch so that the frame profile easily conforms in shape to the corner area of the substrate/glazing as it is attached thereto. A second technique (i.e., non-continuous corner; e.g., see FIGS. 3 and 5) involves making at least two angled cuts all the way through the frame profile thereby resulting adjacent ends of two separate profile strips being angled; with the two strips thereafter being attached to the substrate/glazing so that the angled ends of the two different strips abut or are adjacent one another proximate a corner area of the substrate/glazing. A third technique (i.e., heated corner technique; e.g., see FIGS. 7–8) involves bending a heated portion of the profile frame so that the heated portion stretches/deforms as it is attached to a corner area(s) of the substrate/glazing. After any one of the aforesaid three techniques is used to attach a frame profile to a glazing surface, the resulting window unit (i.e., substrate with profile thereon) may be installed into an appropriate window frame of a vehicle in order to form a vehicle window assembly as shown in FIG. 1.

Figure 3:
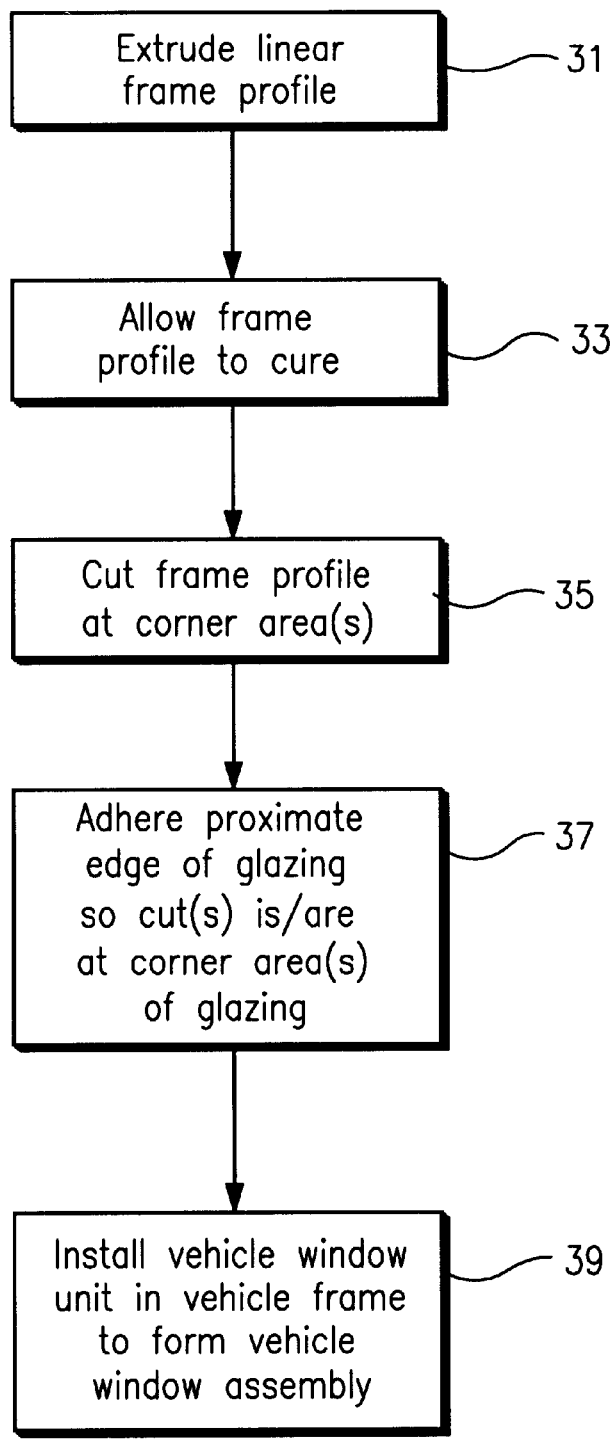
FIG. 3 is a flowchart illustrating steps taken in accordance with an embodiment of this invention.

FIG. 3 is a flowchart illustrating certain steps taken according to an embodiment of this invention during the manufacture of a vehicle window unit. An elongated linear frame profile (see reference numeral 41 in FIGS. 4–9) is extruded (step 31). The elongated profile is preferably flexible and may be made of or include any suitable polymer material including but not limited to: polyurethane (PU) (one or multiple component), polyvinyl chloride (PVC), thermoplastic rubber (TPR), thermoplastic urethane, thermoplastic olefin (TPO), and/or thermoplastic elastomer (TPE) such as Santoprene. The frame profile is allowed to at least partially cure, and more preferably fully cure (step 33). The elongated frame is then cut at what is to be a corner portion thereof (which is ultimately to be aligned with a corner area of a substrate/glazing to which the polymer frame profile is to be attached) (step 35). The frame profile is then adhered to a surface of the substrate/glazing, in a manner such that the cut(s) in the profile enables the frame profile to be more efficiently attached at corner area(s) of the substrate/glazing (step 37). After the adhesive cures, the resulting vehicle window unit may be installed in a vehicle window frame thereby resulting in a vehicle window assembly (step 39).

Figure 4D:
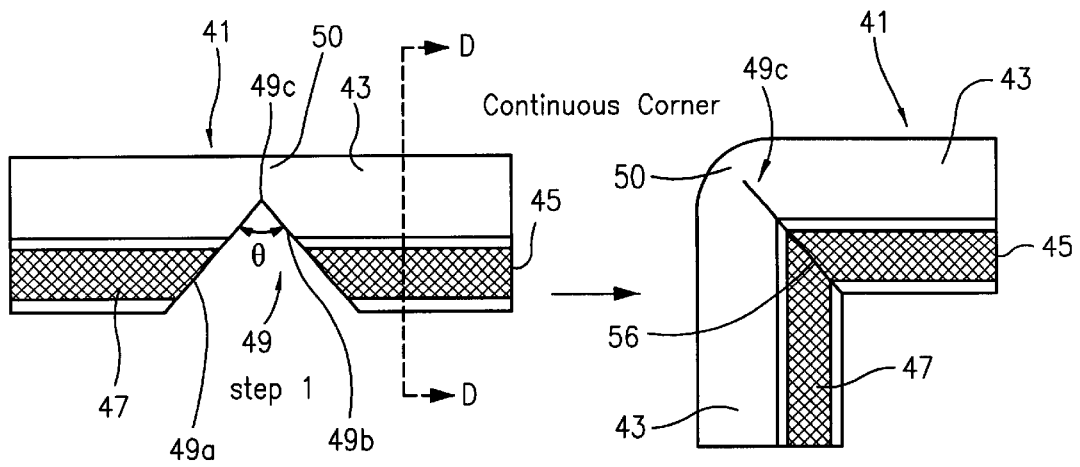
FIG. 4(d) is an exemplary cross sectional view of the frame profile of FIGS. 4(a)–4(b), taken along Section Line D—D in FIG. 4(a).

FIGS. 4(a)–4(d) illustrate one exemplary embodiment of this invention using the process of FIG. 3. A portion of an elongated extruded linear frame profile 41 is shown in FIG. 4(a). FIG. 4(d) is a cross sectional view of the frame profile of FIG. 4(a), taken along section line D—D. As can be seen, the polymer profile 41 includes flexible lip 43 extending from base portion 45. Optionally, at a top of base portion 45 a adhesive/glue 46 receiving area 47 is provided; where adhesive/glue 46 may be for adhering the resulting window unit to window frame 3, 4. Alternatively, adhesive/glue 46 need not be applied over the base portion 45, but instead could be positioned laterally to the side of the polymer frame profile 41 on the glazing. In certain exemplary embodiments, double sided tape 48 may optionally be used to adhere the profile 41 to the surface 51 of substrate/glazing 53.

After being extruded, polymer frame profile 41 may be allowed to cure, stored, or shortly thereafter readied for application to a substrate/glazing. According to the FIG. 4 embodiment, the profile 41 is cut (not all the way through the profile) so as to form notch 49. Notch 49 may be approximately V-shaped in certain embodiments, as shown in FIG. 4(a). Notch 49 includes angled sidewalls 49a and 49b, and apex 49c at a central portion of the notch where the sidewalls meet. At apex 49c, sidewalls 49a and 49b preferably form an angle θ of from about 60–120 degrees with one another, more preferably from about 80–100 degrees, in certain embodiments of this invention. Because notch 49 does not extend all the way through the profile 41, a continuous polymer area 50 is left in the profile 41 which connects the two lengths of the profile on either side of the notch.

After notch 49 is cut in the frame profile 41, it is ready to be attached to a major surface 51 of a substrate/glazing 53 proximate edge 53a thereof. As shown in FIG. 4(b), in attaching/bonding the profile 41 to the substrate/glazing 53 proximate a corner area thereof, the profile 41 is bent from about 60–120 degrees, more preferably from about 80–100 degrees, and most preferably about 90 degrees, about a point/location proximate apex 49c or the central part of the notch 49. In this regard, as the profile 41 is being adhered to the surface 51 of the substrate/glazing, the profile 41 is bent in a manner such that sidewalls 49a and 49b of notch 49 move toward one another (i.e., converge) during the bending so that angle θ progressively decreases during the bending until it reaches an angle of from about 0 to 10 degrees, more preferably from about 0 to 5 degrees, and most preferably from about 0 to 2 degrees, when the corner portion of the profile has been adhered to the substrate/glazing (e.g., see FIGS. 4(b) and 4(c)). This leaves a small slit 56 at the location of notch 49, due to the bending during adherence to the substrate/glazing. In certain embodiments, notch sidewalls 49a and 49b may even abut one another following the bending and adherence to the substrate/glazing 53. The resulting corner area of the profile 41, after being adhered to the glazing as shown in FIGS. 4(b) and 4(c), may be said to be "continuous" due to the presence of continuous polymer portion 50 of the profile at the corner of the window unit which has not been cut or slit. Optionally, polymer portion 50 of the profile 41 may be heated to a temperature of from about 70 to 300 degrees C., thereby enabling portion 50 to be more easily bent as the profile is guided around the corner area of the substrate. In certain embodiments of this invention, adhesive (not shown) used to adhere the resulting window unit to a vehicle window frame 3, 4 may end up covering at least a portion of slit 56 so that the window assembly may be more aesthetically pleasing.

FIG. 4(c) illustrates a vehicle window unit in which a frame profile including a notch 49 cut/stamped thereinto has been bent and attached to surface 51 of glazing 53 (e.g., glass or plastic substrate). The cross section of the profile in FIG. 4(c) differs slightly from that of the profile in FIGS. 4(a)–4(b) and 4(d), for the sake of simplicity.

FIGS. 5(a)–5(d) illustrate another possible exemplary embodiment of this invention using the process of FIG. 3. This embodiment differs from the FIG. 4 embodiment in that the FIG. 5 embodiment has a non-continuous corner formed by making at least two angled cuts 61 and 62 all the way through the frame profile thereby resulting in adjacent ends of two separate profile strips 63 and 64, respectively, being angled. The ends of the two strips 63 and 64 are angled relative to one another at an angle θ of from about 60–120 degrees, more preferably from about 80–100 degrees, in certain embodiments of this invention. The two linear elongated strips 63, 64 of polymer profile 41 are thereafter adhered to the substrate/glazing (e.g., using adhesive/tape 48) so that the angled ends 61, 62 of the two different strips 63, 64 abut or are adjacent one another proximate a corner area of the substrate/glazing thus forming small linear slit 65 between the strips. Bending of the strips 63, 64 may thus be avoided in this embodiment.

Figure 4D:
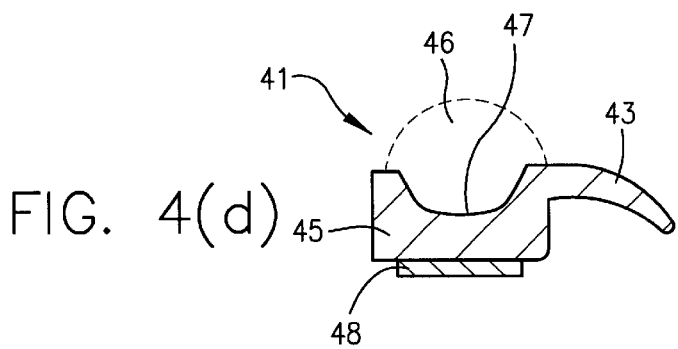
Figure 4C:
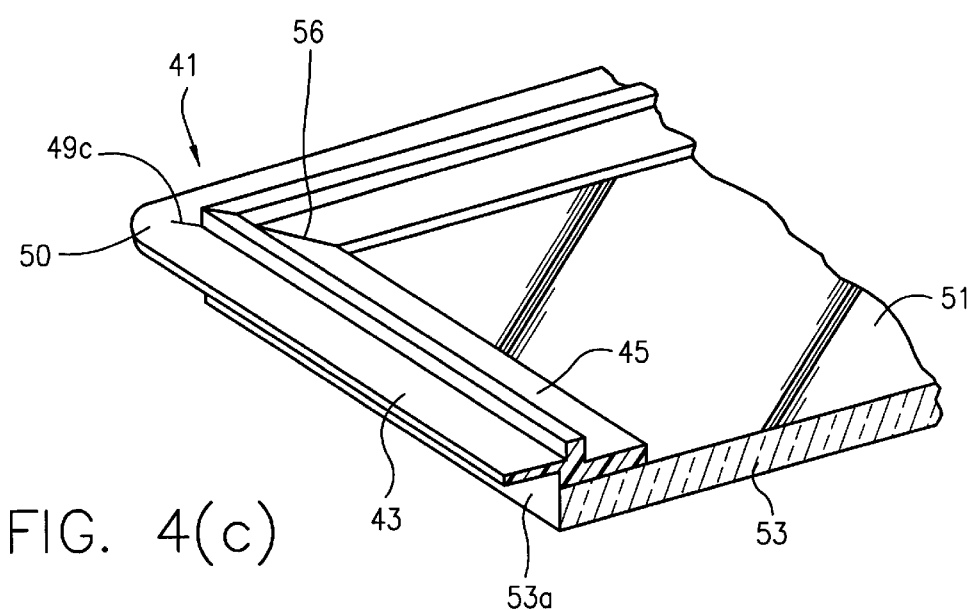
FIG. 4(c) is a perspective view of a polymer frame profile similar to that of FIGS. 4(a) and 4(b) on a glazing or substrate proximate an edge and a corner thereof.
Figures 5A, 5B:
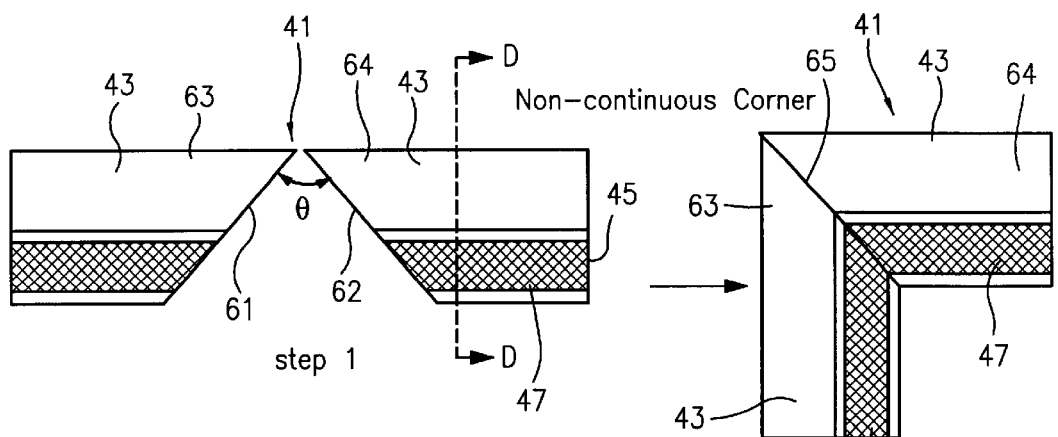
FIG. 5(a) is a top plan view of a polymer frame profile after being extruded and cut, but before being attached to the substrate or glazing, in accordance with another embodiment of the general FIG. 3 embodiment of this invention.
FIG. 5(b) is a top plan view of the polymer frame profile of FIG. 5(a) after it is bent and attached to the substrate or glazing.
Figure 5D:
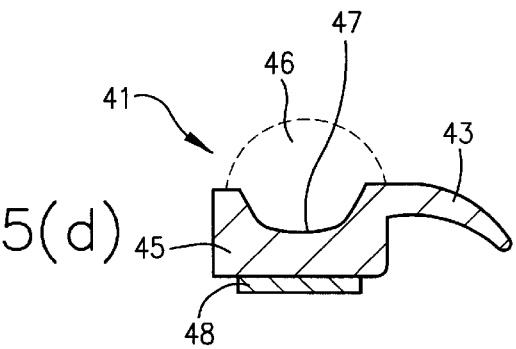
FIG. 5(d) is an exemplary cross sectional view of the frame profile of FIGS. 5(a)–5(b), taken along Section Line D—D in FIG. 5(a).
Figure 5C:
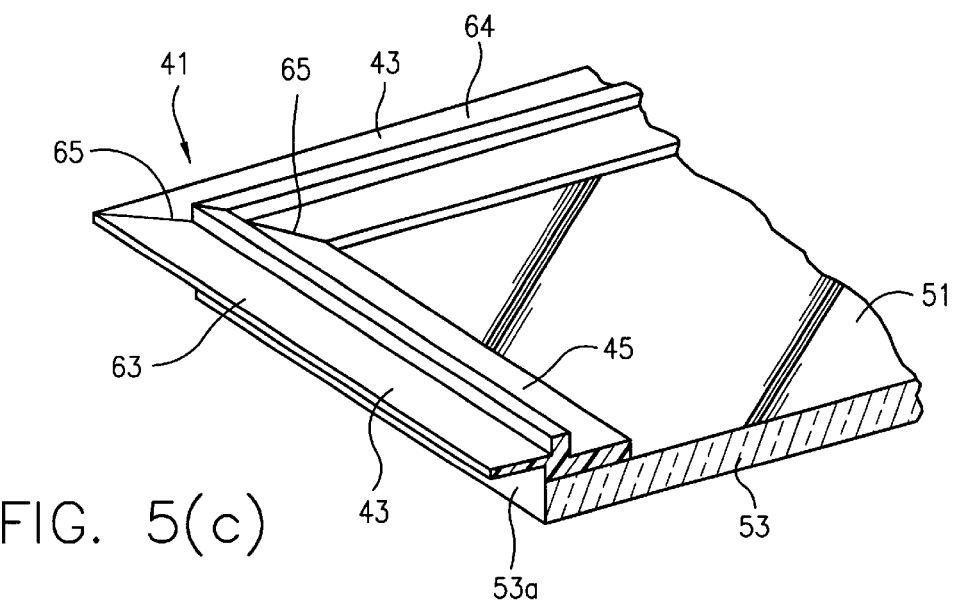
FIG. 5(c) is a perspective view of a polymer frame profile similar to that of FIGS. 5(a) and 5(b) on a glazing or substrate proximate an edge and a corner thereof.
Figure 6A:
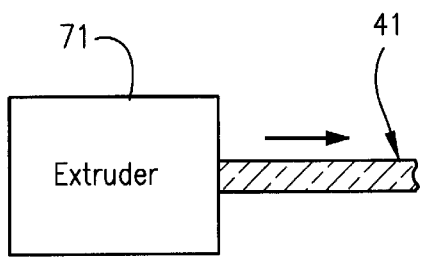
FIG. 6(a) is a schematic and partial cross sectional view of a frame profile according to any of the FIGS. 3–5 embodiments of this invention being extruded according to an exemplary embodiment of this invention.
Figure 6B:
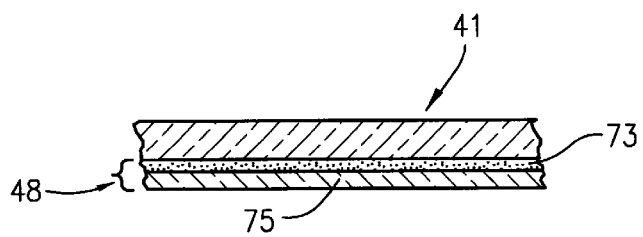
FIG. 6(b) is a cross sectional view of the frame profile of FIG. 6(a) after double sided adhesive tape is applied to a bottom surface thereof.
Figure 6C:
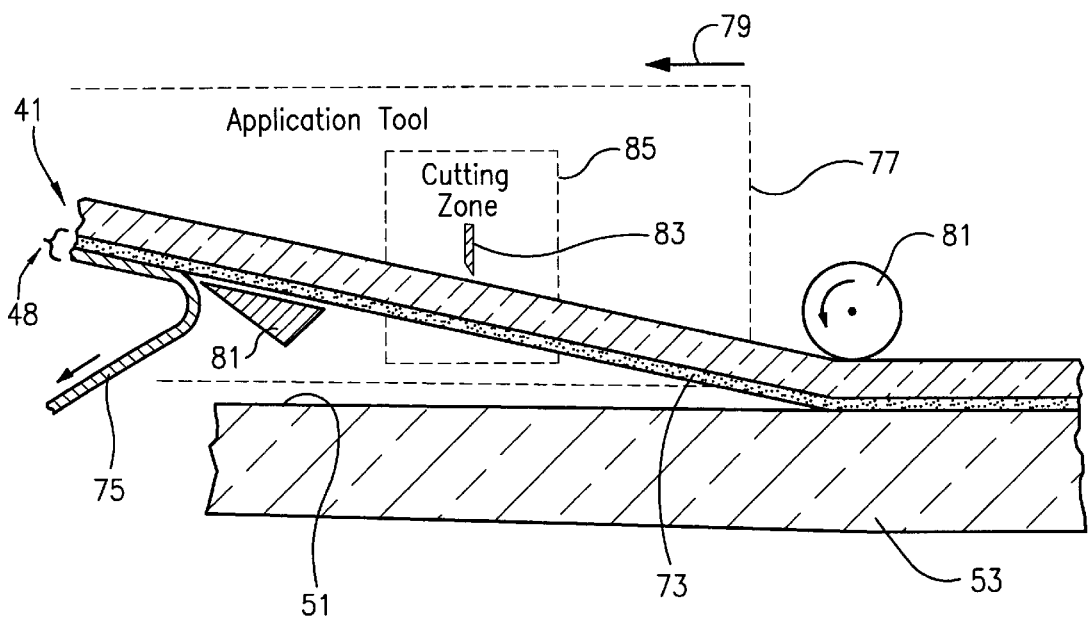
FIG. 6(c) is a schematic partial cross sectional view of the frame profile of FIGS. 6(a) and 6(b) being attached/bonded to a substrate or glazing using the double sided tape.

FIGS. 6(a)–6(c) illustrate how the profiles of the FIGS. 4–5 embodiments may be attached/bonded to substrate 53 according to an exemplary embodiment of this invention. Additional frit/enamel layer(s) may or may not be provided between the substrate 53 and profile 41 in different embodiments of this invention.

FIG. 6(a) shows profile 41 being extruded from extruder 71. After extrusion and curing, double sided adhesive tape (e.g., available from 3M) 48 is applied to a bottom surface of the profile. The double sided tape includes adhesive layer 73 and polymer backing/carrier layer 75, as shown in FIG. 6(b). To adhere/bond the profile 41 to substrate/glazing 53, the FIG. 6(b) profile is fed into application tool 77 (e.g., tool 77 may be moving in direction 79 relative to stationary substrate 53 and profile 41) in a straight or non-bent manner.

Referring to FIG. 6(c), application tool includes stripper 81 which strips off/removes backing layer 75 from the profile so as to expose adhesive layer 73. Along elongated edges 53a of the substrate (i.e., at non-corner areas), the profile is fed down toward the substrate 53 through tool 77 and adhered thereto via adhesive layer 73. Optionally, press roller 81 may be used to apply pressure to the profile thereby forcing it toward surface 51 of the substrate to which it becomes adhered. However, when the profile needs to be adhered at a corner area of the substrate, a blade(s) 83 in cutting zone 85 cuts a notch 49 in the profile 41 at what is to be a corner area/portion thereof.

According to the FIGS. 4 and 6 embodiment, after notch 49 has been formed in the profile, the profile is guided around a corner area of the substrate by tool 77 and simultaneously fed down toward the substrate 53 and adhered thereto via adhesive layer 73 so that slit 56 ends up at a corner area of the substrate and profile as the tool 77 moves around the corner of the top surface 51 of the substrate 53. In such a manner, profiles 41 herein may be applied to a surface 51 of a square, rectangular, or otherwise shaped substrate 53 around all sides/edges thereof, or only along, one, two or three sides thereof and appropriate corners where desired.

When the FIG. 6 tool 77 is used in the context of the FIG. 5 embodiment of this invention, tool 77 need not guide the profile 41 around corner areas of the substrate. Instead, only elongated profile strips 63, 64 are attached along sides of the substrate in straight deposition paths made by tool 77. At a corner area, the tool 77 turns and another profile strip is fed thereinto for attachment to the substrates.

Figure 7:
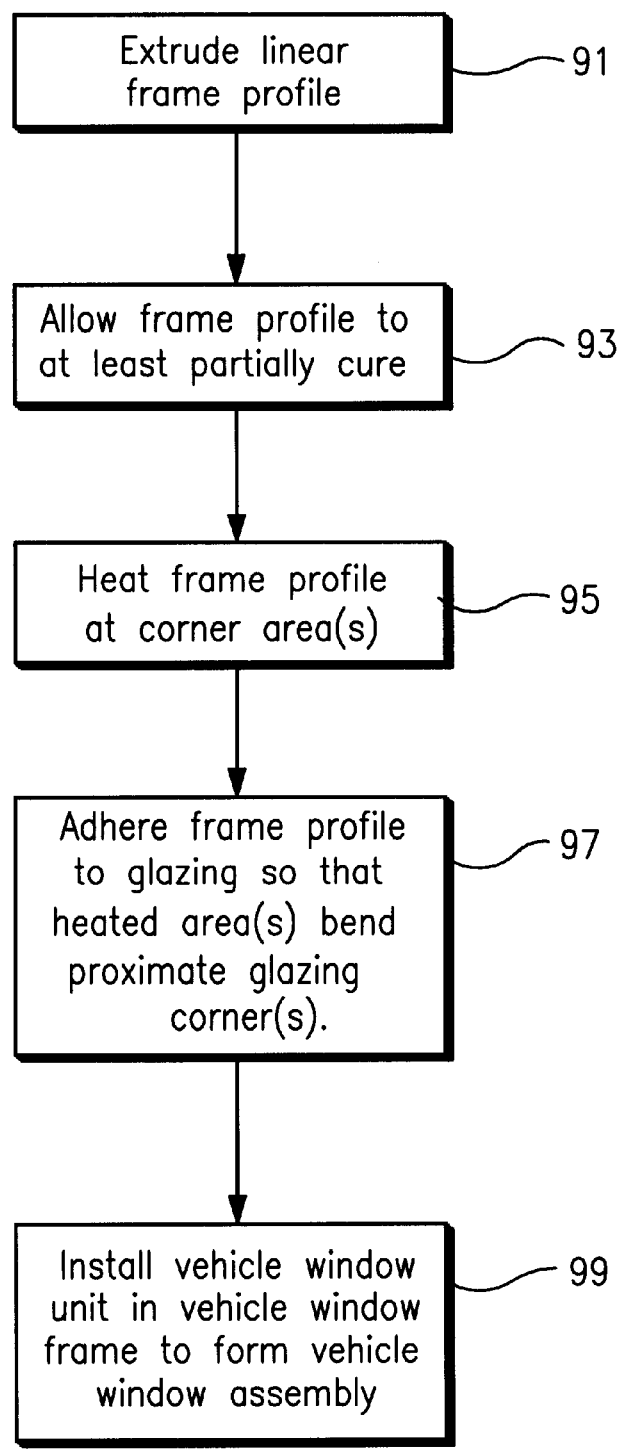
FIG. 7 is a flowchart illustrating steps taken in accordance with another embodiment of this invention.
Figure 8A:
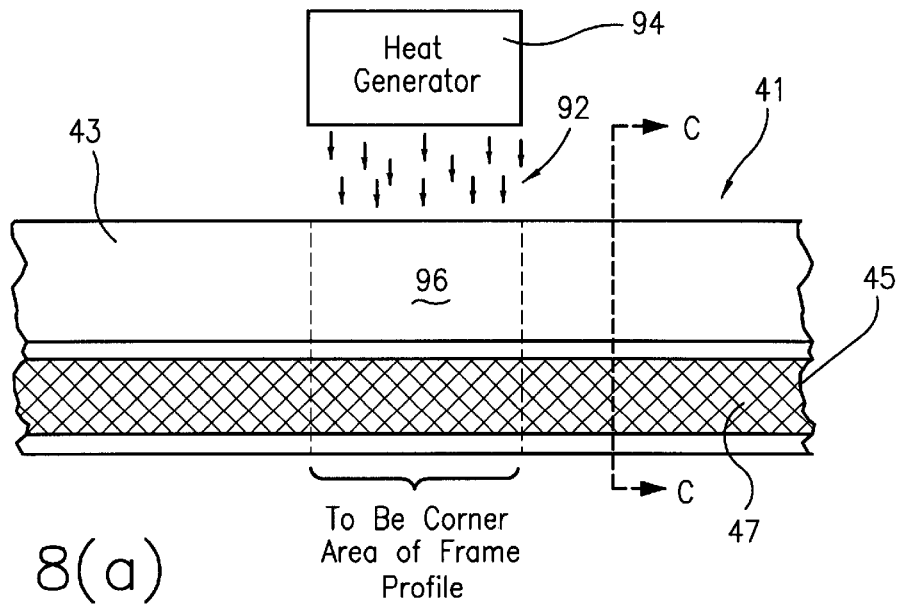
FIG. 8(a) is a top plan/schematic view of a polymer frame profile after being extruded, illustrating at least a portion of it being heated before being attached to the substrate or glazing, in accordance with the FIG. 7 embodiment of this invention.
Figure 8C:
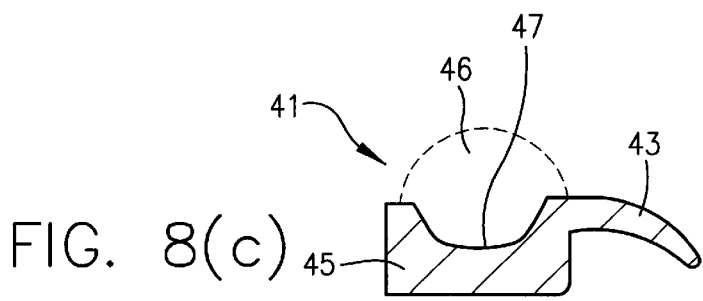
FIG. 8(c) is an exemplary cross sectional view of the frame profile of FIG. 8(a), taken along Section Line C—C in FIG. 8(a).
Figure 8B:
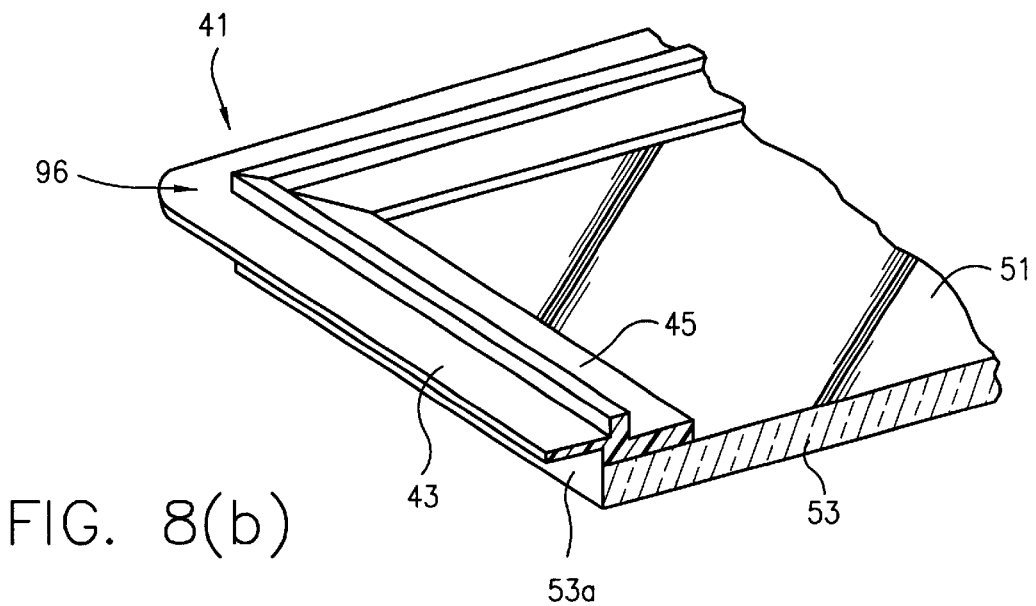
FIG. 8(b) is a perspective view of a polymer frame profile similar to that of FIG. 8(a) on a glazing or substrate proximate an edge and a corner thereof.

FIGS. 7–8 illustrate another embodiment of this invention where the profile 41 may be heated (instead of slit/cut) when rounding corner area(s) of a substrate/glazing, thereby enabling the profile to more easily bend and/or deform into a suitable corner shape for adherence to the substrate. To begin with, elongated linear profile 41 (e.g., of or including TPE) is extruded (step 91). The profile is permitted to partially or fully cure (step 93). Thereafter, heat 92 is directed via heat generator 94 toward the area 96 of the profile 41 which is to be a corner area of the profile (step 95). Because of this heat application, area 96 of the profile is much more easily deformed as the tool 77 rounds the corner of the substrate 53 thereby enabling area 96 of the profile to bend/stretch/deform into a corner area as it is attached to the substrate as shown in FIG. 8(b) (step 97). Such a corner application may be applied to one, two, three or four corners of the glazing, thereby enabling the entire profile to be adhered to the glazing surface 51 in a continuous uninterrupted manner. Thereafter, the resulting window unit of FIG. 8(b) may be installed in a vehicle window frame 3, 4 to form a vehicle window assembly (step 99).

It will be recognized by those skilled in the art that the FIGS. 7–8 embodiment of this invention may be utilized either in combination with the FIG. 4 embodiment of this invention (e.g., in the FIG. 4 embodiment, portion 50 may be heated shortly before and/or as tool 77 guides the profile over and around a corner area(s) of the substrate), or separate from the FIG. 4 embodiment of this invention.

Figure 9A:
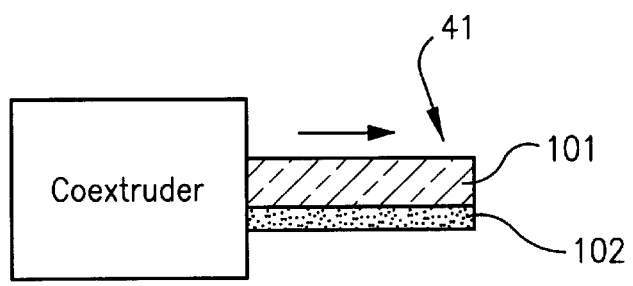
FIG. 9(a) is a schematic and partial cross sectional view of a frame profile according to any of the FIGS. 3–5, 7–8 embodiments of this invention being coextruded along with a selectively activatable adhesive layer according to an embodiment of this invention.
Figure 9B:
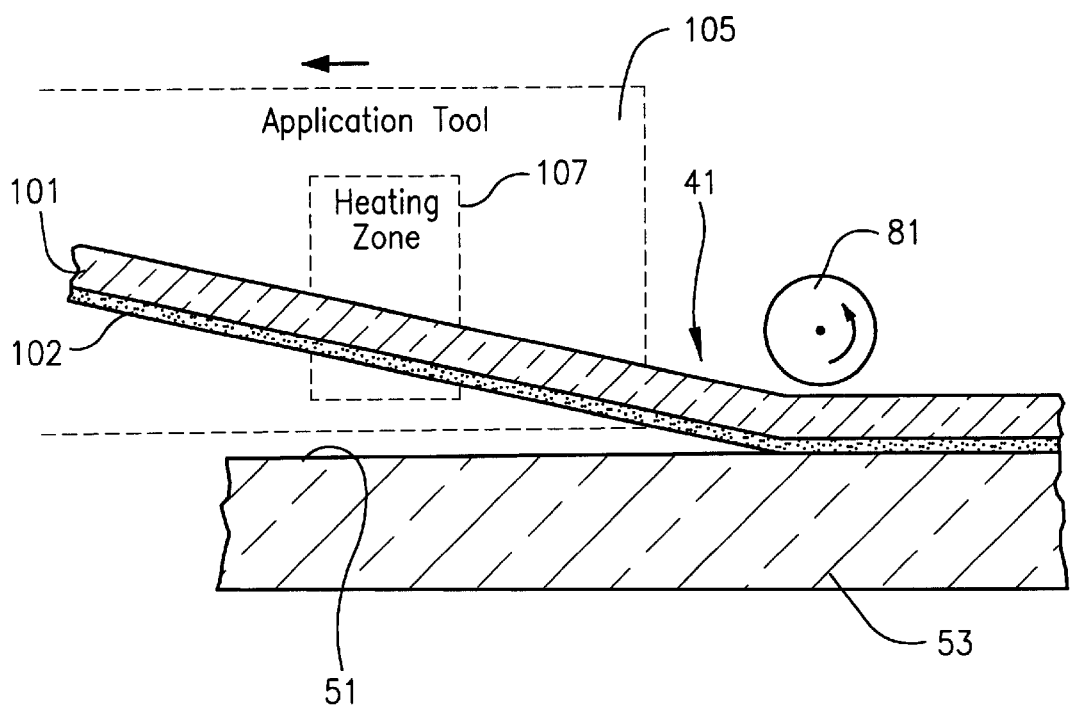
FIG. 9(b) is a schematic partial cross sectional view of the frame profile of FIG. 9(a) being attached/bon ed to a substrate or glazing after the adhesive portion thereof is heat-activated (e.g.,v ia IR radiation, UV radiation, or any other type of heat).

FIGS. 9(a)–9(b) illustrate how the profile of FIGS. 7–8 may be adhered to substrate 53 according to an exemplary embodiment of this invention. Profile 41 is coextruded so as to include a flexible elongated linear polymer profile portion 101 and a selectively activatable flexible adhesive portion 102. Portion 101 may comprise any of the above materials, while portion 102 may be of or include a TPE such as Santoprene. Following the coextrusion, the adhesive 102 is in a non-activated or inactive state. The two portions 101, 102 are bonded/adhered to one another immediately after leaving the coextruder. One or both portion(s) are permitted to partially or fully cure. When it is time to adhere the profile 41 to a substrate, the profile 41 including portions 101 and 102 is fed or directed into application tool 105 wherein the adhesive portion 102 is activated in heating zone 107 (e.g., via UV heating, IR heating, microwave heating, ultrasonic heating, or the like). This same heating zone 107 may function to heat, when necessary, what are to be corner area(s) 96 of the polymer portion 101. In this regard, adhesive 102 is preferably heated to a temperature of from about 300 to 580 degrees F., more preferably about 430 degrees F. When the adhesive portion of the frame profile is active (i.e., immediately after or during the activation), the frame profile is pressed against or toward the substrate (or vice versa) to perfect the adhering/bonding. Optionally, press roller 81 may be used. As will be appreciated by those skilled in the art, the path of tool 105 approximately follows the edge 53a of the substrate 53 so that the profile may be deposited adjacent (i.e., within about 2 inches of) all sides thereof and all corners thereof (or alternatively adjacent only some sides/corners). Upon curing of the adhesive, the polymer profile portion 101 is adhered/bonded to the substrate via the adhesive portion 102 to make up profile 41.

It will also be recognized by those skilled in the art that the profiles of FIGS. 4 and 5 may also be adhered/bonded to a substrate 53 via heat activatable adhesive layer 102 as shown in FIG. 9 and discussed above (instead of via tape 48) in certain embodiments of this invention.

Figure 10A:
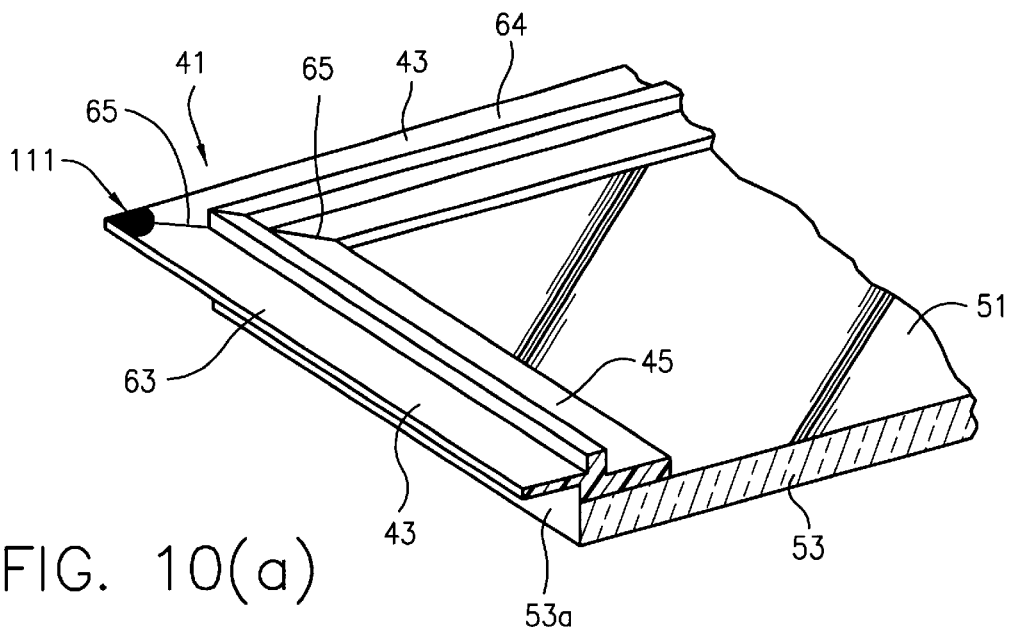
FIG. 10(a) is a perspective view of another embodiment of this invention, where the two adjacent corner lip portions of the FIG. 5 embodiment are adhered or bonded to one another.
Figure 10B:
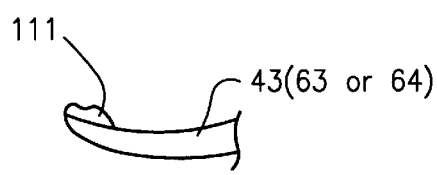
FIG. 10(b) is a cross sectional view of the corner of the lip portion of FIG. 10(a).
Figure 10C:
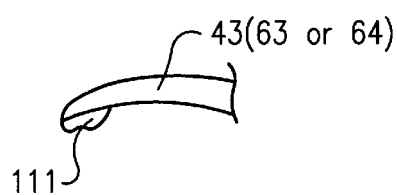
FIG. 10(c) is a cross sectional view of the corner of the lip portion of FIG. 10(a), except that the adhesive or bonding material for joining the two lip corner portions is applied to an underside thereof.

FIGS. 10(a)–10(c) illustrate another embodiment(s) of this invention. In the FIG. 5 embodiment, the two lip corner portions of strip 63 and strip 64 are adjacent one another at the corner of the product, but are not adhered to one another at that point. This may be undesirable in certain instances, and could ultimately cause one or both of the lip corners to peel off or away. This may also be aesthetically non-pleasing in certain instances. Accordingly, FIGS. 10(a)–10(c) illustrate a manner(s) in which to overcome this issues/problem. In FIGS. 10(a) and 10(b), an adhesive material 111 (e.g., spot plastic weld) is applied to at least the corner area of the profile so as to contact both the lip corner of strip 63 and the lip corner of strip 64 thereby joining/adhering the two lip corners to one another at the corner of the product. As can be seen, this adhesive material 111 may be applied to the top-side of the corner lip portions as shown in FIG. 10(b), or alternatively may be applied to the underside of the corner lip portions as shown in FIG. 10(c). This adhesive 111 may be extruded directly onto the lip portions of strips 63, 64, or may be deposited thereon via syringe or any other suitable means. The adhesive 111 may be heat activated in certain embodiments, or alternatively may be active when deposited on the corner lip portions in certain embodiments of this invention.

Figure 11:
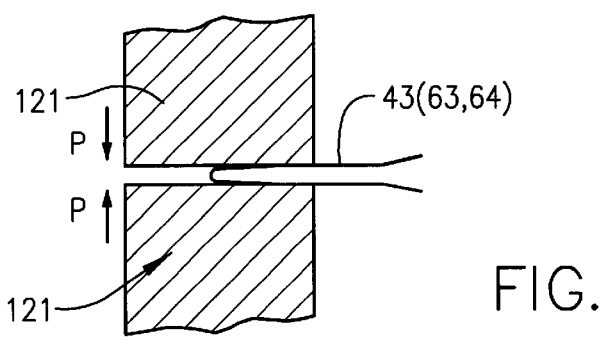
FIG. 11 is a cross sectional view illustrating heat pressing of the lip corner portions of the FIG. 5 embodiment in order to join the same to one another according to an embodiment of this invention.

FIG. 11 illustrates an embodiment of this invention similar to FIG. 10, except that in the FIG. 11 embodiment one or more heated dies and/or press members 121 heat and apply pressure to the two adjacent lip corner portions of strip 63 and strip 64 so as to bond them to one another (i.e., so that adhesive 111 is not needed). In the illustrated embodiment, opposing heated dies or press members 121 sandwich the two adjacent lip corner portions of strips 63 and 64, respectively, therebetween; and apply pressure P thereto. When the lip corner portions are heated and pressure P is applied thereto in FIG. 11, the lip corner portions deform and become bonded/adhered to one another at at least the corner of the product. This may be aesthetically pleasing in certain embodiments, and/or may result in a more durable final product in other embodiments of this invention.

According to yet another embodiment of this invention, polymer material may be extruded in the form of a frame profile 41, cut as discussed above (e.g., notch 49), and immediately deposited on the surface of a glass substrate 53 as shown in FIG. 4(c) before having an opportunity to cure. In this embodiment, the blade cuts the notch in the frame profile while it is still semi-molten, and the profile fully cures after it has been applied to the substrate.

While the invention has been described in connection with what is presently considered to be the most practical and preferred embodiments, it is to be understood that the invention is not to be limited to the disclosed embodiments. To the contrary, the invention is intended to cover various modifications and equivalent arrangements included within the spirit and scope of the appended claims.

What is claimed is:

1. A method of applying a polymer profile frame to a substrate to form a vehicle window unit, the method comprising:

providing an elongated polymer profile frame, wherein the profile frame comprises a flexible lip extending from a base portion;

allowing the polymer profile frame to cure;

cutting the polymer profile frame to form a cut portion thereof, wherein the cut portion comprises a notch that is formed so as to extend completely through the base portion of the profile frame but only part-way through the flexible lip of the profile frame;

guiding the polymer profile frame around a corner area of the substrate while bending the polymer profile frame proximate the cut portion thereof, so that opposing sides of the notch are closer to one another after the bending of the profile frame than before the bending of the profile frame; and adhering or bonding the polymer profile frame to the substrate in a manner such that the cut portion of the profile frame is adhered or bonded to the substrate at or adjacent the corner area thereof.

2. The method of claim 1, wherein a frit or enamel layer is provided between the substrate and the profile frame when the profile frame is adhered or bonded to the substrate; and wherein the elongated polymer profile frame is extruded.

3. The method of claim 1, wherein the notch is approximately V-shaped in the polymer profile frame.

4. The method of claim 3, wherein the notch includes first and second sidewalls or sides which define an angle θ of from about 60–120 degrees with one another.

5. The method of claim 4, where in the first and second sidewalls further define an angle θ of from about 80–100 degrees with one another.

6. The method of claim 1, further comprising the step of installing the substrate with profile thereon in a vehicle window frame to form a vehicle window frame assembly.

7. The method of claim 1, further comprising the step of adhering the polymer frame profile to the substrate using double-sided tape.

8. The method of claim 1, further comprising coextruding the polymer profile frame along with a selectively heat activatable adhesive layer; and the method further comprising heat activating the adhesive layer and using the activated adhesive layer to bond or adhere the profile frame to the substrate.

9. The method of claim 1, further comprising heating what is to be a corner portion of the polymer profile frame to provide a heated corner portion of the profile frame;

guiding the polymer profile frame around the corner area of the substrate while bending and/or stretching the polymer profile frame at the heated corner portion thereof; and adhering or bonding the polymer profile frame to only a major surface of the substrate in a manner such that the heated corner portion of the profile frame is adhered or bonded to the major surface of the substrate at or adjacent the corner area thereof.

10. A method of making a vehicle window unit, the method comprising:

extruding a polymer profile frame;

cutting the polymer profile frame to form a cut portion thereof;

adhering or bonding the polymer profile frame adjacent an edge of a glass substrate in a manner such that the cut portion of the profile frame is adhered or bonded to the substrate at or adjacent a corner area of the substrate;

wherein said cutting comprises cutting all the way through the profile frame in order to form at least first and second separate portions of profile frame, each of the first and second portions having an angled end;

adhering or bonding the polymer profile frame adjacent an edge of the glass substrate in a manner such that the angled end portions of the first and second separate portions of profile frame, respectively, face one another and are located adjacent one another at or adjacent a corner area of the substrate;

further adhering the first and second portions of the profile frame, respectively, to one another; and wherein said adhering comprises sandwiching the first and second angled end portions of the first and second portions of the profile frame between a pair of press or die members, wherein at least one of the press or die members is heated.

11. The method of claim 10, wherein said cutting the polymer profile frame to form a cut portion thereof comprises cutting an approximately V-shaped notch in the polymer profile frame, said notch including first and second sidewalls which converge at an apex.

12. The method of claim 11, wherein the first and second sidewalls define an angle θ of from about 80–100 degrees with one another.

13. A method of making a vehicle window unit, the method comprising:

extruding a polymer profile frame;

cutting the polymer profile frame to form a cut portion thereof;

adhering or bonding the polymer profile frame adjacent an edge of a glass substrate in a manner such that the cut portion of the profile frame is adhered or bonded to the substrate at or adjacent a corner area of the substrate;

wherein said cutting comprises cutting all the way through the profile frame in order to form at least first and second separate portions of profile frame, each of the first and second portions having an angled end;

adhering or bonding the polymer profile frame adjacent an edge of the glass substrate in a manner such that the angled end portions of the first and second separate portions of profile frame, respectively, face one another and are located adjacent one another at or adjacent a corner area of the substrate;

further adhering the first and second portions of the profile frame, respectively, to one another; and wherein said adhering comprises applying an adhesive that contact both of the first and second angled end portions of the first and second portions of the profile frame, respectively.

14. A vehicle window unit comprising:

a polymer profile frame including a flexible lip and a base portion from which the lip extends, the polymer profile frame being supported by a substrate proximate at least one edge and at least one corner of the substrate;

wherein a corner portion of the profile frame includes a slit defined therein so as to enable the profile frame to be more easily provided at or adjacent a corresponding corner area of the substrate; and wherein the slit is formed so as to extend completely through the base portion of the profile frame but only part-way through the flexible lip of the profile frame.

15. The vehicle window unit of claim 14, wherein said slit comprises a notch having opposing sidewalls which converge at an apex where the sidewalls are connected to one another.

16. A method of making a vehicle window unit, the method comprising:

adhering first and second polymer profile frame members adjacent an edge of a glass substrate in a manner such that angled end portions of the first and second polymer profile frame members, respectively, face one another and are located adjacent one another at or adjacent a corner area of the substrate;

each of said first and second polymer profile frame members including a lip and a base portion;

after said adhering, bonding the angled end portions of the first and second polymer profile frame members, respectively, to one another.

17. The method of claim 16, wherein said bonding comprises sandwiching corner lip portions of the first and second angled end portions between first and second dies or press members, and applying heat to the first and second angled end portions so as to bond the first and second end portions to one another proximate respective corners thereof.

18. The method of claim 16, wherein said bonding comprises applying an adhesive material to corner lip portions of the first and second angled end portions in order to bond the first and second angled end portions to one another.

19. A method of making a vehicle window unit, the method comprising:

adhering first and second polymer profile frame members adjacent an edge of a glass substrate in a manner such that end portions of the first and second polymer profile frame members, respectively, face one another and are located adjacent one another at or adjacent a corner area of the substrate;

each of said first and second polymer profile frame members including a lip and a base portion from which the lip extends;

after said adhering, bonding the end portions of the first and second polymer profile frame members, respectively, to one another.

20. The method of claim 19, wherein said bonding comprises sandwiching corner lip portions of the first and second end portions between first and second dies or press members, and applying heat to the first and second end portions so as to bond the first and second end portions to one another proximate respective corners thereof.

21. The method of claim 19, wherein said bonding comprises applying an adhesive material to corner lip portions of the first and second end portions in order to bond the first and second end portions to one another.

* * * * *